United States Patent
Wingen et al.

(10) Patent No.: US 6,551,668 B1
(45) Date of Patent: Apr. 22, 2003

(54) MONOSTABLE FERROELECTRIC ACTIVE MATRIX DISPLAY

(75) Inventors: Rainer Wingen, Hattersheim (DE); Barbara Hornung, Hasselroth (DE); Toshiaki Nonaka, Kakegawa (JP)

(73) Assignee: Aventis Research & Technologies, Frankfurt am Main (DE)

( * ) Notice: Subject to any disclaimer, the term of this patent is extended or adjusted under 35 U.S.C. 154(b) by 0 days.

(21) Appl. No.: 09/719,028

(22) PCT Filed: Jun. 8, 1999

(86) PCT No.: PCT/EP99/03939

§ 371 (c)(1),
(2), (4) Date: Mar. 9, 2001

(87) PCT Pub. No.: WO99/64538

PCT Pub. Date: Dec. 16, 1999

(30) Foreign Application Priority Data

Jun. 8, 1998 (DE) .......................... 198 25 484
Jul. 7, 1998 (DE) .......................... 198 30 203

(51) Int. Cl.$^7$ .................. C09K 19/30; C09K 19/36; C09K 19/34; C09K 19/32; G02F 1/141

(52) U.S. Cl. .................. 428/1.3; 428/1.1; 252/299.61; 252/299.62; 252/299.63; 252/299.7

(58) Field of Search .............. 428/1.1, 1.3; 252/299.01, 252/299.5, 299.61, 299.62, 299.63; 349/184, 185, 186, 168

(56) References Cited

U.S. PATENT DOCUMENTS 4,367,924 A    1/1983  Clark et al.

FOREIGN PATENT DOCUMENTS

| DE | 197 32 381 | 1/1999 |
|----|------------|--------|
| EP | 0 032 362  | 7/1981 |
| EP | 0 916 713  | 5/1999 |
| EP | 0 916 715  | 5/1999 |
| WO | WO 97/04039 | 2/1997 |
| WO | WO 97/12355 | 4/1997 |

*Primary Examiner*—Shean C. Wu
(74) *Attorney, Agent, or Firm*—Frommer Lawrence & Haug LLP

(57) ABSTRACT

In a monostable ferroelectric active matrix display comprising a liquid-crystal layer in the form of a monodomain having an unambiguously defined direction of the layer normal z of the smC* phase, the layer normals z and the preferential direction n of the nematic or cholesteric phase (N* phase) form an angle of more than 5°.

9 Claims, No Drawings

MONOSTABLE FERROELECTRIC ACTIVE MATRIX DISPLAY

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

Replacement of the cathode ray tube with a flat panel screen requires a display technology which simultaneously makes it possible to achieve a high image resolution, i.e. more than 1000 lines, a high image brightness (>200 cd/m$^2$), a high contrast (>100:1), a high frame rate (>60 Hz), an adequate color representation (>16 million colors), a large image format (screen diagonal >40 cm), a low power consumption and a wide viewing angle, at low production costs. At present, there is no technology which fully satisfies all these features simultaneously.

(2) Description of Related Art

Many manufacturers have developed screens which are based on nematic liquid crystals and have been used in recent years in the field of notebook PCs, personal digital assistants, desktop monitors etc. Use is made here of the technologies STN (supertwisted nematics), AM-TN (active matrix—twisted nematics) AM-IPS (active matrix—in-plane switching) and AM-MVA (active matrix—multidomain vertically aligned), which are described in detail in the literature; see, for example, T. Tsukuda, TFT/LCD: Liquid Crystal Displays Addressed by Thin-Film Transistors, Gordon and Breach, 1996, ISBN 2-919875-01-9, and the references cited therein; SID Symposium 1997, ISSN-0097-966X pages 7 to 10, 15 to 18, 47 to 51, 213 to 216, 383 to 386, 397 to 404 and the references cited therein. Furthermore, use is being made of the technologies PDP (plasma display panel), PALC (plasma addressed liquid crystal), ELD (electroluminescent display), FED (field emission display), which are also explained in the above-cited SID report.

Clark and Lagerwall (U.S. Pat. No. 4,367,924) have been able to show that the use of ferroelectric liquid crystals (FLCs) in very thin cells results in opto-electrical switching or display elements which have response times which are faster by a factor of up to 1000 compared with conventional TN ("twisted nematic") cells (see, for example, EP-A 0 032 362). Owing to this and other favorable properties, for example the possibility of bistable switching and the fact that the contrast is virtually independent of the viewing angle, FLCs are basically suitable for areas of application such as computer displays and TV sets, as shown by a monitor marketed in Japan by Canon since May 1995.

The use of FLCs in electro-optical or fully optical components requires either compounds which form smectic phases and are themselves optically active, or the induction of ferroelectric smectic phases by doping compounds which, although forming such smectic phases, are not themselves optically active, with optically active compounds. The desired phase should be stable over the broadest possible temperature range.

The individual pixels of an LC display are usually arranged in an x,y matrix formed by the arrangement of a series of electrodes (conductor tracks) along the rows and a series of electrodes along the columns on the upper or lower side of the display. The points of intersection of the horizontal (row) electrodes and the vertical (column) electrodes form addressable pixels.

This arrangement of the pixels is usually referred to as a passive matrix. For addressing, various multiplex schemes have been developed, as described, for example, in Displays 1993, Vol. 14, No. 2, pp. 86–93, and Kontakte 1993 (2), pp. 3–14. Passive matrix addressing has the advantage of simpler display production and consequently lower production costs, but the disadvantage that passive addressing can only be carried out line by line, which results in the addressing time for the entire screen with N lines being N times the line addressing time. For usual line addressing times of about 50 microseconds, this means a screen addressing time of about 60 milliseconds in, for example, the HDTV (high definition TV, 1152 lines) standard, i.e. a maximum frame rate of about 16 Hz, too slow for displaying moving images. In addition, display of gray shades is difficult. At the FLC Conference in Brest, France (Jul. 20–24, 1997, see Abstract Book 6$^{th}$ International Conference on Ferroelectric Liquid Crystals, Brest/France), a passive FLC display with digital gray shades was shown by Mizutani et al., in which each of the RGB pixels (RGB=red, green, blue) was divided into sub-pixels, allowing the display of gray shades in digital form through partial switching. Using three basic colors (red, green, blue), N gray shades result in 3$^N$ colors. The disadvantage of this method is the considerable increase in the number of screen drivers necessary and thus in the costs.

In the case of the display shown in Brest, three times as many drivers were necessary as in a standard FLC display without digital gray shades.

In so-called active matrix technology (AMLCD), a non-structured substrate is usually combined with an active matrix substrate. An electrically non-linear element, for example a thin-film transistor, is integrated into each pixel of the active matrix substrate. The nonlinear elements can also be diodes, metal-insulator-metal and similar elements, which are advantageously produced by thin-film processes and are described in the relevant literature; see, for example, T. Tsukuda, TFT/LCD: Liquid Crystal Displays Addressed by Thin-Film Transistors, Gordon and Breach, 1996, ISBN 2-919875-01-9, and the references cited therein.

Active matrix LCDs are usually operated with nematic liquid crystals in TN (twisted nematics), ECB (electrically controlled birefringence), VA (vertically aligned) or IPS (in-plane switching) mode. In each case, the active matrix generates an electric field of individual strength on each pixel, producing a change in alignment and thus a change in birefringence, which is in turn visible in polarized light. A severe disadvantage of these processes is the poor video capability owing to excessively slow response times of nematic liquid crystals.

For this and other reasons, liquid crystal displays based on a combination of ferroelectric liquid crystal materials and active matrix elements have been proposed, see for example WO 97/12355, or Ferroelectrics 1996, 179,141–152, W. J. A. M. Hartmann, IEEE Trans. Electron. Devices 1989, 36

(9; Pt. 1), 1895–9, and dissertation, Eindhoven, The Netherlands, 1990.

Hartmann utilized a combination of the so-called "quasi-bookshelf geometry" (QBG) of an FLC and a TFT (thin-film transistor) active matrix to simultaneously achieve high response speed, gray shades and high transmission. However, the QBG is not stable over a broad temperature range, since the temperature dependence of the smectic layer thickness disrupts or rotates the field-induced layer structure. Moreover, Hartmann utilizes an FLC material having a spontaneous polarization of more than 20 $nC/cm^2$, which, for pixels having realistic dimensions of, for example, an area of 0.01 $mm^2$, leads to high electric charges (at saturation, Q=2 A P, A=pixel area, P=spontaneous polarization). With low-cost amorphous silicium TFTs, for example, these high charges cannot reach the pixel in the course of the opening time of the TFT. For these reasons, this technology has not been pursued any further to date. While Hartmann utilizes the charge-controlled bistability to display a virtually continuous gray scale, Nito et al. have suggested a monostable FLC geometry (see Journal of the SID, ½, 1993, pages 163–169) in which the FLC material is aligned by means of relatively high voltages such that only a single stable position results from which a number of intermediate states are generated by application of an electric field via a thin-film transistor. These intermediate states correspond to a number of different brightness values (gray shades) when the cell geometry is matched between crossed polarizers.

One disadvantage of this technique, however, is the occurrence of a streaky texture in the display which limits contrast and brightness of this cell (see FIG. 8 in the abovementioned citation). While it is possible to correct the disadvantageous streaky texture by treatment with a high electric voltage (20–50 V) in the nematic or cholesteric phase (see page 168 of the abovementioned citation), such a field treatment is unsuitable for mass production of screens and usually does not result in temperature-stable textures either. Furthermore, this method produces switching only in an angle range of up to a maximum of once the tilt angle, which is about 22° in the case of the material used by Nito et al. (cf. p. 165, FIG. 6) and thus produces a maximum transmission of only 50% of the transmission of two parallel polarizers.

BRIEF SUMMARY OF THE INVENTION

The object of the present invention is to provide a ferroelectric active matrix liquid crystal display comprising a ferroelectric liquid-crystal mixture, where the liquid-crystal mixture assumes a monostable position, but without forming a streaky texture, is light- and temperature-stable and makes it possible to achieve a very high maximum transmission and a very high contrast.

BRIEF DESCRIPTION OF THE SEVERAL VIEWS OF THE DRAWINGS(S)

Not Applicable.

DETAILED DESCRIPTION OF THE INVENTION

This object is achieved according to the invention by a monostable ferroelectric active matrix display comprising a liquid-crystal layer in the form of a monodomain having an unambiguously defined direction of the layer normal z of the smC* phase, wherein the layer normal z and the preferential direction n of the nematic or cholesteric phase (N* phase) form an angle of more than 5°, where the liquid-crystal layer is composed of a liquid-crystal mixture of at least 5 compounds, which consists of an achiral base mixture comprising at least one compound from the group (I) consisting of (Ia–Ik), and, if desired, additionally at least one compound from the group consisting of (IIa–IIg) and/or at least one compound from group (III), and at least one chiral component from group (IV)

(Ia) $R^1(-A^1-M^1)_a(-A^2-M^2)_b-A^3-(M^4-A^4)_c-(M^5-A^5)_d-R^2$ where $A^3$ is

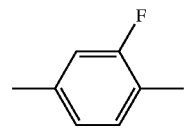

and the remaining substituents are as defined below (Ib) $R^1(-A^1-M^1)_a(-A^2-M^2)_b-A^3-(M^4-A^4)_c-(M^5-A^5)_d-R^2$ where $A^3$ is

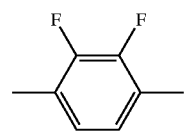

and the remaining substituents are as defined below (Ic) $R^1(-A^1-M^1)_a(-A^2-M^2)_b-A^3-(M^4-A^4)_c-(M^5-A^5)_d-R^2$ where $A^3$ is

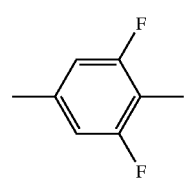

and the remaining substituents are as defined below (Id) $R^1(-A^1-M^1)_a(-A^2-M^2)_b-A^3(M^4A^4)_c(M^5-A^5)_d-R^2$ where $A^3$ is

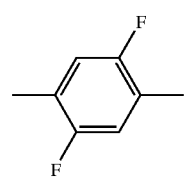

and the remaining substituents are as defined below (Ie) $R^1(-A^1-M^1)_a(-A^2-M^2)_b-A^3-(M^4-A^4)_c-(M^5-A^5)_d-R^2$ where $A^3$ is

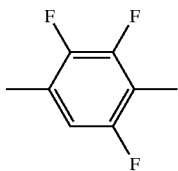

and the remaining substituents are as defined below (If) $R^1(-A^1-M^1)_a(-A^2-M^2)_b-A^3-(M^4-A^4)_c-(M^5-A^5)_d-R^2$
where $A^3$ is

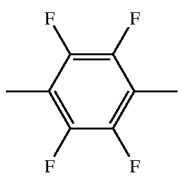

and the remaining substituents are as defined below (Ig) $R^1(-A^1-M^1)_a(-A^2-M^2)_b-A^3-(M^4-A^4)_c-(M^5-A^5)_d-R^2$
where $A^3$ is

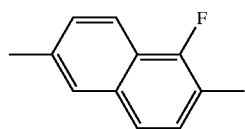

and the remaining substituents are as defined below (Ih) $R^1(-A^1-M^1)_a(-A^2-M^2)_b-A^3-(M^4-A^4)_c-(M^5-A^5)_d-R^2$
where $A^3$ is

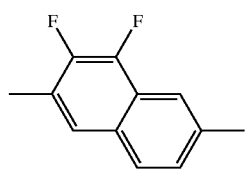

and the remaining substituents are as defined below (Ii)
$R^1(-A^1-M^1)_a(-A^2-M^2)_b-A^3-(M^4-A^4)_c-(M^5-A^5)_d-R^2$
where $A^3$ is

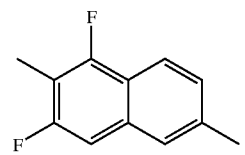

and the remaining substituents are as defined below:
$R^1$ and $R^2$ are, independently of one another, identical or different and are each hydrogen, alkyl or alkyloxy having 2–12 carbon atoms, where one or two —$CH_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^1$ and $R^2$ cannot both be hydrogen $A^1$, $A^2$, $A^4$ and $A^5$ are, independently of one another, identical or different and are each 1,4-phenylene, unsubstituted, monosubstituted or disubstituted by F or Cl, cyclohexane-1,4-diyl, unsubstituted or monosubstituted by F, cyclohex-1-ene-1,4-diyl, cyclohex-2-ene-1,4-diyl, 1-alkyl-1-sila-cyclohexane-1,4-diyl, bicyclo-[2.2.2]octane-1,4-diyl, indane-2,6-diyl, naphthalene-2,6-diyl $M^1$, $M^2$, $M^4$ and $M^5$ are, independently of one another, identical or different and are each a single bond, —OC(=O)—, (O=)C—O—, —OCH$_2$—, —CH$_2$—O—, —CH$_2$CH$_2$—CH$_2$CH$_2$— or —C≡C— a, b, c and d are each zero or 1 with the proviso that $1 \leq \{a+b+c+d\} \leq 3$ and the understanding that $M^x$ is a single bond when the corresponding index is zero (Ik) $R^1(-A^1-M^1)_a(-A^2-M^2)_b-A^3-(M^4-A^4)_c-(M^5-A^5)_d-R^2$
where $A^3$ is

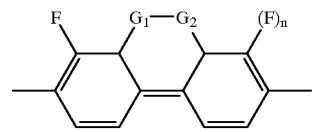

and the remaining substituents are as defined below:

$R^1$ and $R^2$ are, independently of one another, identical or different and are each hydrogen, alkyl or alkyloxy having 2–12 carbon atoms, where one or two —$CH_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^1$ and $R^2$ cannot both be hydrogen $G_1$—$G_2$ is —CH=CH— or —CH$_2$CH$_2$— n is zero or one $A^1$, $A^2$, $A^4$ and $A^5$ are, independently of one another, identical or different and are each 1,4-phenylene, unsubstituted, monosubstituted or disubstituted by F or Cl, or cyclohexane-1,4-diyl, unsubstituted or monosubstituted by F, $M^1$, $M^2$, $M^4$ and $M^6$ are, independently of one another, identical or different and are each a single bond, —OC(=O)—, (O=)C—O—, —OCH$_2$—, —CH$_2$—O—, —CH$_2$CH$_2$—, —CH$_2$CH$_2$—CH$_2$CH$_2$— or —C≡C— a, b, c and d are each zero or 1 with the proviso that $0 \leq \{a+b+c+d\} \leq 2$ and the understanding that $M^x$ is a single bond when the corresponding index is zero, (IIa) $R^3(-A^7-M^7)_a(-A^8-M^8)_b-A^6-(M^9-A^9)_c-(M^{10}-A^{10})_d-R^4$
where $A^6$ is

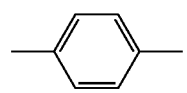

$R^3$ and $R^4$ are, independently of one another, identical or different and are each hydrogen, alkyl or alkyloxy having 2–12 carbon atoms, where one or two —$CH_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that R$^3$ and R$^4$ cannot both be hydrogen A$^7$, A$^8$, A$^9$ and A$^{10}$ are, independently of one another, identical or different and are each 1,4-phenylene, cyclohexane-1,4-diyl, cyclohex-1-ene-1,4-diyl, cyclohex-2-ene-1,4-diyl or bicyclo-[2.2.2]octane-1,4-diyl, M$^7$, M$^8$, M$^9$ and M$^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$—CH$_2$CH$_2$— or —C≡C— a, b, c and d are each zero or 1 with the proviso that 1≦{a+b+c+d}≦3 and the understanding that M$^x$ is a single bond when the corresponding index is zero, (IIb) R$^3$(—A$^7$—M$^7$)$_a$(—A$^8$—M$^8$)$_b$—A$^6$—(M$^9$—A$^9$)$_c$(M$^{10}$—A$^{10}$)$_d$—R$^4$ where A$^6$ is

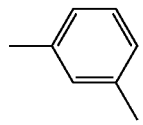

R$^3$ and R$^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that R$^3$ and R$^4$ cannot both be hydrogen A$^7$, A$^8$, A$^9$ and A$^{10}$ are, independently of one another, identical or different and are each 1,4-phenylene, unsubstituted or monosubstituted or disubstituted by F or Cl, cyclohexane-1,4-diyl, unsubstituted or monosubstituted by F, cyclohex-1-ene-1,4-diyl, cyclohex-2-ene-1,4-diyl, 1-alkyl-1-sila-cyclohexane-1,4-diyl, bicyclo-[2.2.2]octane-1,4-diyl, indane-2,6-diyl, naphthalene-2,6-diyl M$^7$, M$^8$, M$^9$ and M$^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$—CH$_2$CH$_2$— or —C≡C— a, b, c and d are each zero or 1 with the proviso that 1≦{a+b+c+d}≦3 and the understanding that M$^x$ is a single bond when the corresponding index is zero, (IIc) R$^3$(—A$^7$—M$^7$)$_a$(—A$^8$—M$^8$)$_b$—A$^6$—(M$^9$—A$^9$)$_c$(M$^{10}$—A$^{10}$)$_d$—R$^4$ where A$^6$ is

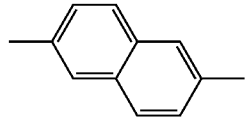

R$^3$ and R$^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl with the proviso that R$^3$ and R$^4$ cannot both be hydrogen M$^7$, M$^8$, M$^9$ and M$^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$—CH$_2$CH$_2$— or —C≡C—

A$^7$, A$^8$, A$^9$ and A$^{10}$ are, independently of one another, identical or different and are each 1,4-phenylene, unsubstituted or monosubstituted or disubstituted by F or Cl, cyclohexane-1,4-diyl, unsubstituted or monosubstituted by F, cyclohex-1-ene-1,4-diyl, cyclohex-2-ene-1,4-diyl, 1-alkyl-1-sila-cyclohexane-1,4-diyl, bicyclo-[2.2.2]octane-1,4-diyl, indane-2,6-diyl, a, b, c and d are each zero or 1 with the proviso that 1≦{a+b+c+d}≦3 and the understanding that M$^x$ is a single bond when the corresponding index is zero, (IId) R$_3$(—A$_7$—M$^7$)$_a$(—A$^8$—M$^8$)$_b$—A$^6$—(M$^9$—A$^9$)$_c$—(M$^{10}$—A$^{10}$)$_d$—R$_4$ where A$^6$ is

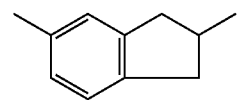

R$^3$ and R$^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that R$^3$ and R$^4$ cannot both be hydrogen A$^7$, A$^8$, A$_9$ and A$^{10}$ are, independently of one another, identical or different and are each 1,4-phenylene, cyclohexane-1,4-diyl, unsubstituted or monosubstituted by F, cyclohex-1-ene-1,4-diyl, cyclohex-2-ene-1,4-diyl, 1-alkyl-1-sila-cyclohexane-1,4-diyl, bicyclo-[2.2.2]octane-1,4-diyl, naphthalene-2,6-diyl, M$^7$, M$^8$, M$^9$ and M$^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$—CH$_2$CH$_2$— or —C≡C— a, b, c and d are each zero or 1 with the proviso that 1≦{a+b+c+d}≦3 and the understanding that M$^x$ is a single bond when the corresponding index is zero, (IIe) R$^3$(—A$^7$—M$^7$)$_a$(—A$^8$—M$^8$)$_b$—A$^6$—(M$^9$—A$^9$)$_c$—(M$^{10}$—A$^{10}$)$_d$—R$^4$ where A$^6$ is

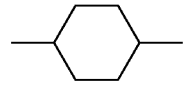

R$^3$ and R$^4$ are, independently of one another, identical or different and are each hydrogen, alkyl or alkyloxy having 2–12 carbon atoms, where one or two —CH$_2$— groups may be replaced, by —CH=CH—, —OC(=O)—, —(O=)C—O—, —Si(CH$_3$)$_2$— or cyclopropane-1,2-diyl and one or more H atoms may also be replaced by F with the proviso that $R^3$ and $R^4$ cannot both be hydrogen $A^7$, $A^8$, $A^9$ and $A^{10}$ are, independently of one another, identical or different and are each cyclohexane-1,4-diyl, unsubstituted or monosubstituted by F, cyclohex-1-ene-1,4-diyl, cyclohex-2-ene-1,4-diyl, $M^7$, $M^8$, $M^9$ and $M^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$CH$_2$— or —C≡C— a, b, c and d are each zero or 1 with the proviso that $1 \leq \{a+b+c+d\} \leq 3$ and the understanding that $M^x$ is a single bond when the corresponding index is zero, (IIf) $R^3(-A_7-M^7)_a(-A^8-M^8)_b-A^6-(M^9-A^9)_c-(M^{10}-A^{10})_d-R^4$ where $A^6$ is

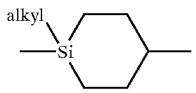

$R^3$ and $R^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^3$ and $R^4$ cannot both be hydrogen $A^7$, $A^8$, $A^9$ and $A^{10}$ are, independently of one another, identical or different and are each 1,4-phenylene, cyclohexane-1,4-diyl, unsubstituted or monosubstituted by F, cyclohex-1-ene-1,4-diyl, cyclohex-2-ene-1,4-diyl, bicyclo[2.2.2]octane-1,4-diyl $M^7$, $M^8$, $M^9$ and $M^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$CH$_2$— or —C≡C— a, b, c and d are each zero or 1 with the proviso that $1 \leq \{a+b+c+d\} \leq 3$ and the understanding that $M^x$ is a single bond when the corresponding index is zero, (IIg) $R^3(-A^7M^7)_a(-A^8-M^8)_b-A^6-(M^9-A^9)_c-(M^{10}-A^{10})_d-R^4$ where $A^6$ is

$R^3$ and $R^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^1$ and $R^2$ cannot both be hydrogen $A^7$, $A^8$, $A^9$ and $A^{10}$ are, independently of one another, identical or different and are each cyclohexane-1,4-diyl, unsubstituted or monosubstituted by F, cyclohex-1-ene-1,4-diyl, cyclohex-2-ene-1,4-diyl, $M^7$, $M^8$, $M^9$ and $M^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$CH$_2$— or —C≡C— a, b, c and d are each zero or 1 with the proviso that $1 \leq \{a+b+c+d\} \leq 3$ and the understanding that $M^x$ is a single bond when the corresponding index is zero, (IIh) $R^3(-A^7-M^7)_a-A^8-M^8)_b-A^6-(M^9-A^9)_c-(M^{10}-A^{10})_d-R^4$ where $A^6$ is

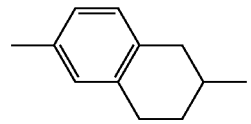

$R^3$ and $R^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^3$ and $R^4$ cannot both be hydrogen $A^7$, $A^8$, $A^9$ and $A^{10}$ are, independently of one another, identical or different and are each cyclohexane-1,4-diyl, unsubstituted or monosubstituted by F, cyclohex-1-ene-1,4-diyl, cyclohex-2-ene-1,4-diyl, $M^7$, $M^8$, $M^9$ and $M^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$CH$_2$— or —C≡C— a, b, c and d are each zero or 1 with the proviso that $1 \leq \{a+b+c+d\} \leq 3$ and the understanding that $M^x$ is a single bond when the corresponding index is zero, (III) $R^5(-A^{11}-M^{11})_a(-A^{12}M^{-12})_b-A^{13}$ where $A^{13}$ is

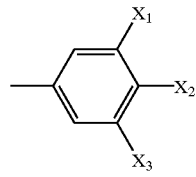

and $X^1$, $X^2$ and $X^3$ are, independently of one another, identical or different and are each H, Cl, F, OCF$_2$H or CF$_3$ with the proviso that at least one of $X^1$, $X^2$ and $X^3$ is not H, $R^5$ is hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F $A^{11}$ and $A^{12}$ are, independently of one another, identical or different and are each 1,4-phenylene, cyclohexane-1,4-diyl, cyclohex-1-ene-1,4-diyl, cyclohex-2-ene-1,4-diyl, 1-alkyl-1-sila-cyclohexane-1,4-diyl, bicyclo[2.2.2]octane-1,4-diyl, indane-2,6-diyl, naphthalene-2,6-diyl, $M^{11}$ and $M^{12}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$—CH$_2$CH$_2$— or —C≡C— a, b, d and c, are each zero or 1 with the proviso that $1 \leq \{a+b\} \leq 3$ and the understanding that M$^x$ is a single bond when the corresponding index is zero, (IV) R$^6$(—A$^{14}$—M$^{14}$)$_a$(—A$^{15}$—M$^{15}$)$_b$—(M$^{16}$—A$^{16}$)$_c$(M$^{17}$—A$^{17}$)$_d$—M$^{18}$—R$^7$ where R$^6$ is hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F R$^7$ is a moiety having at least one asymmetric carbon atom which is either part of an alkyl group having 3 to 12 carbon atoms, where one or two —CH$_2$— groups may also be replaced by —O—, —OC(=O)— or —(O=)C—O— and one of the substituents of the asymmetric carbon atom must be —CH$_3$, —CF$_3$, —OCH$_3$, —CH$_3$, Cl or F, or part of a 3- to 7-membered carbocycle, where one or two nonadjacent —CH$_2$— groups may also be replaced by —O— or one—CH$_2$— group may be replaced by —OC(=O)— or —(O=)C—O—, A$^{14}$, A$^{15}$, A$^{16}$ and A$^{17}$ are, independently of one another, identical or different and are each 1,4-phenylene, unsubstituted, monosubstituted or disubstituted by F or Cl, 1,3-phenylene, unsubstituted, monosubstituted or disubstituted by F or Cl, cyclohexane-1,4-diyl, unsubstituted or monosubstituted by F or CN, cyclohex-1-ene-1,4-diyl, 1-fluorocyclohex-1-ene-1,4-diyl, cyclohex-2-ene-1,4-diyl, 2-oxocyclohexane-1,4-diyl, 2-cyclohexen-1-one-3,6-diyl, 1-alkyl-1-silacyclohexane-1,4-diyl, bicyclo[2.2.2]octane-1,4-diyl, spiro[4.5]decane-2,8-diyl, spiro[5.5]undecane-3,9-diyl, indane-2,6-diyl, naphthalene-2,6-diyl, unsubstituted, monosubstituted or disubstituted by F or CN, pyrimidine-2,5-diyl, pyridine-2,5-diyl, pyrazine-2,5-diyl, pyridazine-3,6-diyl, quinoline-2,6-diyl, quinoline-3,7-diyl, isoquinoline-3,7-diyl, quinazoline-2,6-diyl, quinoxaline-2,6-diyl, 1,3-dioxane-2,5-diyl, thiophene-2,4-diyl, thiophene-2,5-diyl, 1,3-thiazole-2,4-diyl, 1,3-thiazole-2,5-diyl, benzthiazole-2,6-diyl, 1,3,4-thiadiazole-2,5-diyl, piperidine-1,4-diyl or piperazine-1,4-diyl, M$^{14}$, M$^{15}$, M$^{16}$ and M$^{17}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$—CH$_2$CH$_2$— or —C≡C—

M$^{18}$ is a single bond, if the moiety having the asymmetric carbon atom is part of an alkyl chain, and a single bond, —OCH$_2$—, —CH$_2$—O—, —OC(=O)— or C(O=)O—, if the asymmetric carbon atom is part of the carbocycle defined under R$^7$ a, b, c and d are each zero or 1 with the proviso that $1 \leq \{a+b+c+d\} \leq 3$ and the understanding that M$^x$ is a single bond when the corresponding index is zero.

Preferred mixtures have one or more of the following features:

R$^1$ and R$^2$ or R$^3$ and R$^4$, respectively, are each straight-chain alkyl or alkoxy having 2 to 12 carbon atoms the mixture comprises at least one compound in which, in R$^1$ or R$^2$ or R$^3$ or R$^4$, one nonterminal —CH$_2$— group is replaced by —OC(=O)— in at least one compound of the formulae (I) or (II), in R$^1$ and/or R$^2$ and/or R$^3$ or R$^4$, at least one or more —CH$_2$— groups, but not the —CH$_2$— group adjacent to the nucleus, is replaced by —CF$_2$— in at least one compound of the formulae (I) or (II), R$^1$ or R$^2$ or R$^3$ or R$^4$ is hydrogen R$^7$ is sec-alkyl or sec-alkoxy having 4 to 12 carbon atoms R$^7$ is 2-methylalkyl or 2-methylalkoxy or 2-methylalkylcarbonyloxy or 2-methylalkyloxycarbonyl having 4 to 12 carbon atoms R$^7$ is 2-fluoroalkyl or 2-fluoroalkoxy or 2-fluoroakylcarbonyloxy or 2-fluoroalkyloxycarbonyl having 3 to 12 carbon atoms R$^7$ is 2-trifluoromethylalkyl or 2-trifluoromethylalkoxy or 2-trifluoromethylalkylcarbonyloxy or 2-trifluoromethylalkyloxycarbonyl having 3 to 12 carbon atoms R$^7$ comprises the group [—O—CH(CH$_3$)—C(=O)O—] as part of an alkyl chain, R$^7$ comprises the group —C(=O)O— as part of a 5- or 6-membered cycle R$^7$ comprises the group oxirane-2,3-diyl.

The achiral base mixture may additionally comprise at least one compound having a phenylpyrimidine, fluorophenylpyrimidine, difluorophenyl-pyrimidine, phenylpyridine, fluorophenylpyridine or difluorophenylpyridine group. In this case, the presence of 3 or more of these compounds is preferred. Preference is given to achiral compounds having (difluoro)phenylpyrimidine groups. The mixture may additionally comprise compounds having benzthiazole-2,6-diyl or thiophene-2,5-diyl groups.

The achiral base mixture may comprise at least one compound having one fluorine atom, at least one compound having two fluorine atoms, and at least one of these compounds may additionally comprise a heterocyclic group, if desired.

The achiral base mixture may preferably comprise at least one compound of the formula (Ia), at least one compound of the formula (Ib) and preferably at least one compound of the formula (Ig). These compounds may additionally contain one of the abovementioned heterocyclic groups.

The proportion of heterocycles in the liquid-crystal mixture can be more than 20% by weight, preferably more than 30% by weight, particularly preferably more than 40% by weight, based on the total liquid-crystal mixture. These are preferably at least two phenylpyrimidines or difluorophenylpyrimidines and at least one compound having a benzthiazole-2,6-diyl group and at least one compound having a thiophene-2,5-diyl group.

The base mixture may comprise at least one, preferably at least two, particularly preferably at least three, difluoroterphenyl compounds.

In the chiral compounds of the formula (IV), the chiral center may preferably be located in a fluoroalkyl, (trifluoromethyl)alkyl, methylalkyl or oxirane group.

The active matrix FLCD of the invention comprises, as optically active layer, a ferroelectric liquid-crystalline medium (liquid-crystal phase) having a phase sequence of isotropic—nematic or cholesteric (N*)—smectic C* or a phase sequence of isotropic—nematic or cholesteric (N*)—smectic A*—smectic C*, where the smectic A* phase has a range of existence (phase range) of not more than 2° C., preferably not more than 1° C., particularly preferably not more than 0.5° C. The asterisk (*) attached to the phase name indicates a chiral phase.

The FLC mixtures exhibit high resistance and voltage retaining ability values.

The displays are preferably produced by a process which comprises introducing the liquid-crystal layer into the space between a rubbed upper substrate plate and a rubbed lower substrate plate of the active matrix display, the rubbing directions on the upper substrate plate and the lower substrate plate being essentially parallel, and cooling the liquid-crystal phase from the isotropic phase, a direct electric current being applied to the display at least during the N*→smC* or N*→smA*→smC* phase transition.

The FLC mixture is filled into an active matrix display. Production and components of an AM display of this type are described in detail in the above-cited Tsukuda reference. However, in contrast to nematic displays, the thickness of the FLC layer is only from 0.7 to 2.5 μm, preferably 1–2 μm. Moreover, the rubbing directions on upper and lower substrate plates are essentially parallel. The term "essentially parallel" includes antiparallel rubbing directions or rubbing directions which are weakly crossed, i.e. up to 10°.

It is important for the operation of this display that in the production of the display, during controlled cooling, a direct electric current, preferably of less than 5 V, is applied and maintained during the N*→smC* or N→smA*→smC* phase transition, with the result that the whole display assumes a monostable monodomain which appears completely dark between crossed polarizers.

Once this domain has been obtained, the direct current is switched off. In contrast to the abovementioned approach by Hartmann or conventional bistable FLCDs, the resulting texture is monostable. This means that the preferred n director (which indicates the preferential direction of the long axes of the molecules) is in the rubbing direction of the cell, whereas the z director (which indicates the preferential direction of the smectic layer normal) is oblique relative to the rubbing direction by approximately the tilt angle value. This configuration is exactly the opposite of the conventional bistable cell according to Clark and Lagerwall in which the z director is in the rubbing direction.

In contrast to Nito's approach, this is exactly the orientation in which there are no two layer normals, and thus no two orientation domains, which ultimately lead to the unwanted streaky texture described above, but a single unambiguous direction of the z director and thus a single monodomain only. Furthermore, it is possible to obtain twice the tilt angle, which leads to 100% transmission, based on parallel polarizers, i.e. double brightness is achieved.

The display thus obtained appears completely dark at a suitable angle of rotation between crossed polarizers. On applying an addressing voltage of only a few volts, the display appears bright, it being possible to vary the brightness continuously by means of the voltage, and is almost as bright as two parallel polarizing films when saturated. An important feature of this display is that the angle between the preferential direction of the nematic (or cholesteric) phase and the layer normal (z director) is ideally equal to the tilt angle of the smectic C phase, or at least essentially equal to the tilt angle. For the purposes of the invention, "essentially" means preferably a range from half the tilt angle to the full tilt angle, particularly preferably from 0.8 to 1.0 times the tilt angle, but at least 5°.

The ferroelectric active matrix liquid crystal display of the invention is very useful in practice, in particular for TV, HDTV or multimedia, since it combines high transmission, short response times, gray scale and thus full color capability, low-cost production and a broad temperature range. Furthermore, the display can be operated at voltages of 10 volts, preferably of ≦8 V, particularly preferably of ≦5 V.

In particular, the term "active matrix display" as used herein includes an LCD in which one of the two substrates is replaced by the rear side of an IC chip (IC=integrated circuit) as described, for example, in D. M. Walba, Science 270, 250–251 (1993) or http://www.displaytech.com.

The spontaneous polarization of the active matrix FLCD of the invention is preferably less than 15 nC/cm$^2$, preferably in the range of from 0.01 to 10 nC/cm$^2$ at the operating temperature of the display.

The length of the chiral nematic or cholesteric pitch in the liquid-crystal layer is preferably more than 50 μm in a temperature range of at least 2° C. above the smectic phase transition.

The displays may be used for example in the TV, HDTV or multimedia areas or in the area of information processing, e.g. in notebook PCs, personal digital assistants or desktop monitors.

The processes for producing the materials which are suitable for the mixtures of the invention are known in principle, as is the production of liquid-crystal mixtures from the individual components. For example, compounds of the respective formulae below are described in:

(Ia) EP-B-0 210215 and GB-B 2198743

(Ib) EP-B-0 210 215 and JP-B 2732765

(Ic) Gray et al., Mol. Cryst.Liq. Cryst. 1991, vol. 204, pp. 43–64

(Id) Gray et al., Mol. Cryst.Liq. Cryst. 1991, vol. 204, pp. 43–64

(Ie) EP-B 602596

(If) Xu et al., Liq. Cryst. 1995, 18(1), 105–8

(Ig) JP-A 09052859

(Ih) DE-A 19522167

(Ii) DE-A-196 52252

(Ik) U.S. Pat. No. 5,648,021

(IIa) Flüssige Kristalle in Tabellen II [Liquid Crystals in Tables II], pp. 269–304

(IIb) U.S. Pat. No. 5,447,656

(IIc) Flüssige Kristalle in Tabellen II [Liquid Crystals in Tables II], pp. 313–322

(IId) EP-A-0 546 338

(IIe) Flüssige Kristalle in Tabellen II [Liquid Crystals in Tables II], pp. 32–72

(IIf) EP-A-0 761 674, 742 222, 732 335, 727 428 etc.

(IIg) Flüssige Kristalle in Tabellen II [Liquid Crystals in Tables II], pp. 85–95

(III) EP-A-0 832 954

(IV) chiral dopants having, as moiety comprising an asymmetric
  carbon atom,
  oxirane EP-B-0 292 954/263 437
  dioxolane EP-B-0 351 746/361 272
  2,3-difluoroalkyloxy U.S. Pat. No. 5,501,506
  2-fluoroalkyloxy U.S. Pat. No. 4,798,680
  α-chlorocarboxylate U.S. Pat. No. 4,855,429

α-fluorocarboxylate Arakawa et al., Liquid Crystals 1997, vol. 23, no. 5 p. 659–666 methyl-branched alkyl chains EP-B-0 201 578, 211 030 lactones e.g. U.S. Pat. Nos. 5,061,398, 5,256,330, 5,026, 506 and compounds containing the structural elements
silylalkyl from EP-B0 366561
cyclopropylalkyl from EP-B-0 318423/398155
perfluoroalkyl from Ferroelectrics 1988, 85, 375–384,
or U.S. Pat. Nos. 4,886,619, 5,082,587, 5,254,747,
5,262,082, 5,437,812 or 5,482,650
perfluorocylohexyl from DE-A-197 48818

EXAMPLES

Example 1

The particular suitability of the compounds of the invention for use as components of ferroelectric liquid-crystal mixtures for active matrix displays is demonstrated by the measurements below, in which the compunds of the invention are tested in comparison to other components which have also been suggested as components of ferroelectric liquid-crystal mixtures.

The resistance of the following components is measured using an appropriate measurement set-up.

a) 2-(4-Octyloxyphenyl)-5-octylpyrimidine (synthesis in accordance with DD-WP 95892, purification in accordance with Nagashima et al., Liq.Crystals 1997, vol. 4, pp. 537–546)

b) 2-(4-Ethylphenyl)-5-(4-octylphenyl)-(1,3,4)-thiazole (synthesis/purification in accordance with EP-B309514)

c) 5-(4-Nonanoyloxyphenyl)-2-(4-hexylphenyl)-1,3-thiazole (synthesis/purification in accordance with EP-B 439170)

d) 2'-Fluoro-4-octyloxy-4"-pentylterphenyl Example of Compound (Ia)

(synthesis/purification in accordance with GB-B 2198743)

e) 2,3-Difluoro-4-heptyl-4"-pentylterphenyl Example of Compound (Ib)

(synthesis/purification in accordance with EP-B 329752)

f) 4-Decyl-2,3-difluoro-4"-pentylterphenyl Example of Compound (Ib)

(synthesis/purification in accordance with EP-B 329752)

g) 2',3'-Difluoro-4-hexyloxy-4"-pentylterphenyl Example of Compound (Ib)

(synthesis/purification in accordance with EP-B 329752)

h) 4-(Octyloxy)-phenyl 4-(Cyclohexyl)-cyclohexanecarboxylate Example of Compound (IIa)

TABLE 1

| | a | b | c | d | e | f | g | h |
|---|---|---|---|---|---|---|---|---|
| Resistance[T ohm] | 0.2 | 0.06 | 0.3 | 1.6 | 2.3 | 2.8 | 2.0 | 2.0 |

Table 1 demonstrates the particular suitability of the compounds of the invention for forming ferroelectric liquid-crystal mixtures for active matrix displays since it is possible with the materials of the invention to achieve higher resistance values by standard operations, and thus even mixtures having a high voltage retaining ability can be obtained.

Example 2

A chiral smectic liquid-crystal mixture having the phase sequence −12 (supercoolable to −30) $S_c^*$ 77.5 N 102.5–104.9 I, a spontaneous polarization of 4.1 nC/cm² and consisting of

| | |
|---|---|
| 5-decyl-2-(4-octyloxyphenyl)pyrimidine | 8.1% by weight |
| 2-(4-decyloxyphenyl)-5-octylpyrimidine | 8.1% by weight |
| (S)-5-decyl-2-[4-(2-fluorodecyloxy)phenyl)]pyrimidine | 4% by weight |
| 5-nonyl-2-(4-octyloxyphenyl)pyrimidine | 8.1% by weight |
| 2-fluoro-4-pentylphenyl 4'-octylbiphenyl-4-ylcarboxylate(S)-3-[4-(4-methylhexyl)phenyl]-6-(4-pentyloxyphenyl)fluorobenzene | 8.1% by weight 8.1% by weight |
| 2-(2,3-difluoro-4-octyloxy)phenyl-1-fluoro-6-octylnaphthalene | 8.1% by weight |
| 2,3-difluoro-4-nonyl-4"-pentylterphenyl | 4.1% by weight |
| 2,3-difluoro-4-hexyloxy-4"-octylterphenyl | 6.1% by weight |
| 2,3-difluoro-4-heptyloxy-4"-pentylterphenyl | 6.1% by weight |
| 2,3-difluoro-4"-heptyl-4-pentyloxyterphenyl | 6.1% by weight |
| 2',3'-difluoro-4-heptyl-4"-octyloxyterphenyl | 10.1% by weight |
| 4-(5-dodecylpyrimidin-2-yl)phenyl-(trans-4-hexylcyclohexane)carboxylic ester | 15% by weight | is tested for its electro-optical properties in a test cell. The test cell has an electrode distance of 1.3 µm (micrometer), the indium-tin oxide (ITO) electrodes are provided with an LQT-120 alignment layer available from Hitachi Chemicals.

First, the transmission/voltage diagram is determined. To this end, To this end, the filled test cell is aligned by cooling it down, a direct voltage of 3 volts being applied in the temperature range from 80° C. to 70° C., which results in the formation of a monostable monodomain which appears completely dark in a polarizing microscope between crossed polarizers at the optimum angle of rotation. The electro-optical behavior of the cell is then investigated by means of monopolar and square-wave addressing pulses.

First, monopolar voltage pulses of 10 ms duration are applied, and the transmission is measured as a function of voltage. The following results are a obtained at 30° C.:

| Voltage in V | Transmission (photodiode signal in mV) |
|---|---|
| 0 | 0 |
| 1 | 10 |
| 2 | 60 |
| 3 | 240 |
| 4 | 330 |
| 5 | 420 |

The 420 mV value corresponds to a transmission of about 70% of the transmission of two parallel polarizers and of about 85%, based on the maximum transmission of the empty test cell.

Subsequent analysis of the response time of the cell (switch-on time for monopolar pulses and switch-on/switch-off time for square-wave voltage) gave the following results (30° C.):

| Voltage in V | Response time in ms (t10–90) Square-wave voltage 60 Hz | Response time in ms (t10–90) Monopolar pulses 10 ms |
|---|---|---|
| 2 | 1.35 | 1.5 |
| 3 | 1.15 | 0.95 |
| 4 | 0.70 | 0.60 |
| 5 | 0.48 | 0.42 |

The results show the high active-matrix addressing response speed which is entirely sufficient for video applications and the continuous gray scale. Moreover, no "image sticking" effects or "boats", i.e. disadvantageous back-switching effects, were observed up to a voltage of 6 volts.

Example 3

A chiral smectic liquid-crystal mixture having the phase transitions $S_c^*$—N— 72° C. and N—I—100° C., a spontaneous polarization of 3.8 nC/cm² and consisting of

| | |
|---|---|
| 2-(2,3-difluoro-4-heptyloxyphenyl)-5-nonylpyrimidine | 8.1% by weight |
| 2-(2,3-difluoro-4-octyloxyphenyl)-5-nonylpyrimidine | 8.1% by weight |
| 2-(2,3-difluoro-4-nonyloxyphenyl)-5-nonylpyrimidine | 8.1% by weight |
| (S)-5-decyl-2-[4-(2-fluorodecyloxy)phenyl]pyrimidine | 4% by weight |
| 2-fluoro-4-pentylphenyl 4'-octylbiphenyl-4-ylcarboxylate | 8.1% by weight |
| (S)-3-[4-(4-methylhexyl)phenyl]-6-(4-pentyloxyphenyl)fluorobenzene | 8.1% by weight |
| 2-(2,3-difluoro-4-octyloxy)phenyl-1-fluoro-6-octylnaphthalene | 8.1% by weight |
| 2,3-difluoro-4-nonyl-4"-pentylterphenyl | 4.1% by weight |
| 2,3-difluoro-4-hexyloxy-4"-octylterphenyl | 6.1% by weight |
| 2,3-difluoro-4-heptyloxy-4"-pentylterphenyl | 6.1% by weight |
| 2,3-difluoro-4"-heptyl-4-pentyloxyterphenyl | 6.1% by weight |
| 2',3'-difluoro-4-heptyl-4"-octyloxyterphenyl | 10.1% by weight |
| 4-(5-dodecylpyrimidin-2-yl)phenyl-(trans-4-hexylcyclohexane)carboxylic ester | 15% by weight | produces the following values in a measurement set-up as described in Example 2:

| Voltage in V | Transmission (in %) 100% = parallel polarizers |
|---|---|
| 0 | 0 |
| 1.5 | 1 |
| 2 | 8 |
| 2.25 | 11 |
| 2.5 | 20 |
| 3 | 34 |
| 3.25 | 40 |
| 3.5 | 46 |
| 4 | 55 |
| 4.5 | 60 |
| 5 | 65 |
| 5.5 | 68 |
| 6 | 72 |
| 6.5 | 73 |
| 7 | 74 |

| Voltage in V | Response time in ms (t10–90) Square-wave voltage 60 Hz at 30° C. | Relaxation time in ms (t90–10) Square-wave voltage 60 Hz at 30° C. | Response time in ms (t10–90) Square-wave voltage 60 Hz at 50° C. |
|---|---|---|---|
| 3 | 1.43 | 0.155 | 1.21 |
| 4 | 0.75 | 0.139 | 0.54 |
| 5 | 0.53 | 0.132 | 0.4 |
| 6 | 0.4 | 0.123 | 0.3 |
| 7 | 0.31 | 0.116 | no measured value |

Example 4

A chiral smectic liquid-crystal mixture comprising [% by weight]

| | |
|---|---|
| 2-(4-decyloxyphenyl)-5-octylpyrimidine | 12.6% |
| 5-octyl-2-(4-octylphenyl)pyrimidine | 15.9% |
| 2-(4-hexyloxyphenyl)-5-octylopyrimidine | 16.5% |
| 2-(2,3-difluoro-4-heptyloxyphenyl)-5-nonylpyrimidine | 7.0% |
| 2-(2,3-difluoro-4-octyloxyphenyl)-5-nonylpyrimidine | 7.0% |
| 2-(2,3-difluoro-4-nonyloxyphenyl)-5-nonylpyrimidine | 7.0% |
| 5-octyl-2-(4'-propylbiphenyl-4-yl)pyrimidine | 12.5% |
| 4-(4-heptyl-2-fluorophenyl)phenyl trans-4-pentyl-cyclohexanecarboxylate | 20.0% |
| 4-(5-octyloxypyrimidin-2-yl)phenyl(2R,3R)-3-propyloxiranecarboxylate | 1.5% | having the phase sequence I81.0–79.2 N* 54.7 Sc* yields a monodomain in which the angle (between the layer normal z and the preferential direction n of the nematic/cholesteric phase) is 9.20 (60 Hz, 20 V), and a transmission (5 V, 60 Hz) of 68.4% of the value of two parallel polarizers in the measurement set-up described above.

Example 5

A similar mixture to that in Example 4, which comprises 20% of 2',3'-difluoro-4"-heptylterphenyl-4-yl nonanoate instead of 4-(4-heptyl-2-fluorophenyl)phenyl trans-4-pentylcyclohexanecarboxylate, has the phase sequence I79.8–77.4 N* 61.0 Sc, and, in the monodomain, a Δ value (20 V, 60 Hz) of 9.60 and a transmission (5 V, 60 Hz) of 73.6% of the value of two parallel polarizers.

Example 6

A similar mixture to that in Example 4, which comprises 20% of 2-fluoro-4-heptylphenyl 3'-fluoro-4'-octyloxy-triphenyl-1,1'-4-carboxylate instead of 4-(4-heptyl-2-fluorophenyl)phenyl trans-4-pentylcyclohexanecarboxylate, has the phase sequence I80.5–79.0 N* 60.2 Sc*, and, in the monodomain, a Δ value (20 V, 60 Hz) of 12.40 and a transmission (5 V, 60 Hz) of 77.2% of the value of two parallel polarizers.

What is claimed is:

1. A monostable ferroeltric active matrix display comprising a liquid-crystal layer in the form of a monodomain having an unambiguously defined direction of the layer normal z of the smC* phase, wherein the layer normals z and the preferential direction n of the nematic or cholesteric phase (N* phase) form an angle of more than 5°, where the liquid crystal layer is composed of a liquid-crystal mixture of at least 5 compounds, which consists of an achiral base mixture comprising at least one compound from the group (1) consisting of (Ia–Ik), and, optionally with the addition at least one compound from the group consisting of (IIa–IIg) or at least one compound from group (iii), and at least one chiral component from group (IV)

(Ia) $R^1(-A^1-M^1)_a(-A^2-M^2)_b-A^3-(M^4-A^4)_c-(M^5-A^5)_d-R^2$ where $A^3$ is

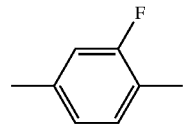

and the remaining substituents are as defined below (Ib) $R^1(-A^1-M^1)_a(-A^2-M^2)_b-A^3-(M^4-A^4)_c-(M^5-A^5)_d-R^2$ where A³ is

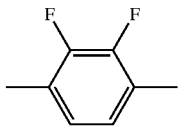

and the remaining substituents are as defined below (Ic) R¹(—A¹—M¹)$_a$(—A²—M²)$_b$—A³—(M⁴—A⁴)$_c$—(M⁵—A⁵)$_d$—R² where A³ is

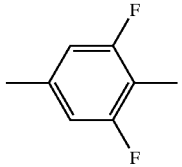

and the remaining subsituients are as defined below (Id) R¹(—A¹—M¹)$_a$(—A²—M²)$_b$—A³—(M⁴—A⁴)$_c$—(M⁵—A⁵)$_d$—R² where A³ is

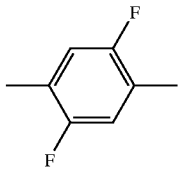

and the remaining substituents are as defined below (Ie) R¹(—A¹—M¹)$_a$(—A²—M²)$_b$—A³—(M⁴—A⁴)$_c$—(M⁵—A⁵)$_d$—R² where A³ is

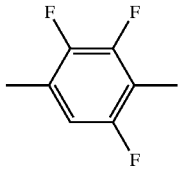

and the remaining substiuents are as defined below (If) R¹(—A¹—M¹)$_a$(—A²—M²)$_b$—A³—(M⁴—A⁴)$_c$—(M⁵—A⁵)$_d$—R² where A³ is

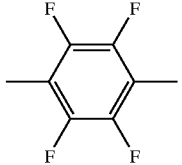

and the remaining substituents are as defined below (Ig) R¹(—A¹—M¹)$_a$(—A²—M²)$_b$—A³—(M⁴—A⁴)$_c$—(M⁵A⁵)$_d$—R² where A³ is

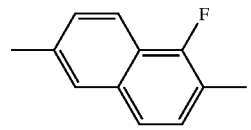

and the remaining substituents are as defined below (Ih) R¹(—A¹—M¹)$_a$(—A²—M²)$_b$—A³—(M⁴—A⁴)$_c$—(M⁵—A⁵)$_d$—R² where A³ is

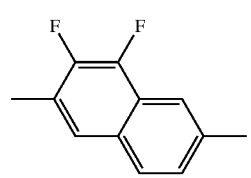

and the remaining substituents are as defined below (Ii) R¹(—A¹—M¹)$_a$(—A²—M²)$_b$—A³—(M⁴—A⁴)$_c$—(M⁵—A⁵)$_d$—R² where A³ is

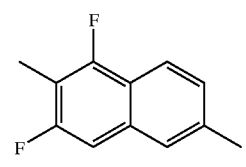

and the remaining substituents are as defined below

R¹ and R² are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-dryl and one or more H atoms may also be replaced by F with the proviso that R¹ and R² cannot both be hydrogen A¹, A², A³ and A⁴ are, independently of one another, identical or different and are each 1,4-phenylene, unsubstituted, monosubstituted or disubstituted by F or Cl, cyclohexane-1,4-diyl, unsubstituted or monosubstituted by F, cyclohex-l-ene-1,4-diyl, cyclohex-2-ene-1,4-diyl, 1-alkyl-1-sila-cyclohexane-1,4-diyl, bicyclo-[2.2.2]octane-1,4-diyl, indane-2,6-diyl, naphthalene-2,6-diyl M¹, M², M⁴ and M⁵ are, independently of one another, identical or different and are each a single bond, —OC(=O)—, (O=)C—O—, —OCH$_2$—, —CH$_2$—O—, —CH$_2$CH$_2$CH$_2$CH$_2$— or —C≡C— a, b, c and d are each zero or 1 with the proviso that $1 \leq \{a+b+c+d\} \leq 3$ and the understanding that is a single bond when the corresponding index is zero (Ik) R¹(—A¹—M¹)$_a$(—A²—M²)$_b$—A³—(M⁴—A⁴)$_c$—(M⁵—A⁵)$_d$—R² where $A^3$ is

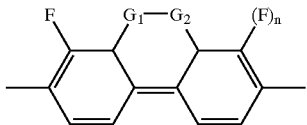

and the remaining substituents are as defined below:
$R^1$ and $R^2$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^1$ and $R^2$ cannot both be hydrogen $G^1$-$G_2$ is —CH=CH— or —CH$_2$CH$_2$— n is zero or one $A^1$, $A^2$, $A^3$ and $A^4$ are, independently of one another, identical or different and are each 1,4-phenylene, unsubstituted, monosubstituted or disubstituted by F or Cl, or cyclohexane-1,4-diyl, unsubstituted or monosubstituted by F, $M^1$, $M^2$, $M^4$ and $M^5$ are, independently of one another, identical or different and are each a single bond, —OC(=O)—, (O=)C—O—, —OCH$_2$—, —CH$_2$—O—, —CH$_2$CH$_2$—, —CH$_2$CH$_2$—CH$_2$CH$_2$— or —C≡C— a, b, c and d are each zero or 1 with the proviso that $0 \leq \{a+b+c+d\} \leq 2$ and the understanding that $M^x$ is a single bond when the corresponding index is zero, (IIa) $R^3(\text{—}A^7\text{—}M^7)_a(\text{—}A^8\text{—}M^8)_b\text{—}A^6\text{—}(M^9\text{—}A^9)_c\text{—}(M^{10}\text{—}A^{10})_d\text{—}R^2$ where $A^6$ is

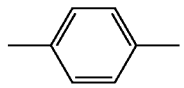

$R^3$ and $R^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^3$ and $R^4$ cannot both be hydrogen $A^7$, $A^8$, $A^9$ and $A^{10}$ are, independently of one another, identical or different and are each 1,4-phenylene, cyclohexane-1,4-diyl, cyclohex-1-ene-1,4-diyl, cyclohex-2-ene-1,4-diyl or bicyclo-[2.2.2]octane-1,4-diyl, $M^7$, $M^8$, $M^9$ and $M^{10}$ are, independently of one another, identical or ,different and are each a single bond, —OC(=O)—, —(O=)C—O—, —OCH$_2$—, CH$_2$—O—, —CH$_2$CH$_2$—, —CH$_2$CH$_2$—CH$_2$CH$_2$— or —C≡C— a, b, c and d are each zero or 1 with the proviso that $1 \leq \{a+b+c+d\} \leq 3$ and the understanding that $M^x$ is a single bond when the corresponding index is zero, (IIb) $R^3(\text{—}A^7\text{—}M^7)_a(\text{—}A^8\text{—}M^8)_b\text{—}A^6\text{—}(M^9\text{—}A^9)_c\text{—}(M^{10}\text{—}A^{10})_d\text{—}R^4$ where $A^6$ is

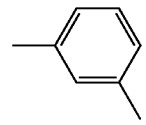

$R^3$ and $R^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^3$ and $R^4$ cannot both be hydrogen $A^7$, $A^8$, $A^9$ and $A^{10}$ are, independently of one another, identical or different and are each 1,4-phenylene, unsubstituted or monosubstituted or disubstituted by F or Cl, cyclohexane1,4-diyl, unsubstituted or monosubstituted by F, cyclohex-1-ene-1,4-diyl, cyclohex-2-ene-1,4-diyl, 1-alkyl-1-sila-cyclohexane-1,4-diyl, bicyclo-[2.2.2]octane-1,4-diyl, indane-2,6-diyl, naphthalene-2,6-diyl $M^7$, $M^8$, $M^9$ and $M^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$—CH$_2$CH$_2$— or —C≡C— a, b, c and d are each zero or 1 with the proviso that $1 \leq \{a+b+c+d\} \leq 3$ and the understanding that $M^x$ is a single bond when the corresponding index is zero, (IIc) $R^3(\text{—}A^7\text{—}M^7)_a(\text{—}A^8\text{—}M^8)_b\text{—}A^6\text{—}(M^9\text{—}A^9)_c\text{—}(M^{10}\text{—}A^{10})_d\text{—}R^4$ where $A^6$ is

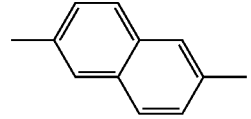

$R^3$ and $R^4$ are, independently of one another, identical or different and are each hydrogen, alkyl or alkyloxy having 2–12 carbon atoms, where one or two —CH$_2$— groups may be replaced by —CH=CH—, —OC(=O)—, —(O=)C—O—, —Si(CH$_3$)$_2$— or cyclopropane-1,2-diyl and one or more H atoms may also be replaced by F with the proviso that $R^3$ and $R^4$ cannot both be hydrogen $A^7$, $A^8$, $A^9$ and $A^{10}$ are, independently of one another, identical or different and are each 1,4-phenylene, cyclohexane-1,4-diyl, unsubstituted or monosubstituted by F, cyclohex-1-ene-1,4-diyl, cyclohex-2-ene-1, 4-diyl, 1-alkyl-1-sila-cyclohexane-1,4-diyl, bicyclo-[2.2.2]octane-1,4-diyl, indane-2,6-diyl, $M^7$, $M^8$, $M^9$ and $M^{10}$ are, independently of one another, identical or different and are each a single bond, —OC(=O)—, —(O=)C—O—, —OCH$_2$—, —CH$_2$—O—, —CH$_2$CH$_2$—, —CH$_2$CH$_2$—CH$_2$CH$_2$— or —C≡C— a, b, c and d are each zero or 1 with the proviso that $1 \leq \{a+b+c+d\} \leq 3$ and the understanding that $M^x$ is a single bond when the corresponding index is zero, (IId) $R^3(\text{—}A^7\text{—}M^7)_a(\text{—}A^8\text{—}M^8)_b\text{—}A^6\text{—}(M^9\text{—}A^9)_c\text{—}(M^{10}\text{—}A^{10})_d\text{—}R^4$ where A⁶ is

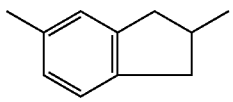

R³ and R⁴ are, independently of one another, identical or different and are each hydrogen, alkyl or alkyloxy having 2–12 carbon atoms, where one or two —H₂— groups may be replaced by —CH=CH—, —OC(=O)—, —(O=)C—O—, —Si(CH₃)₂— or cyclopropane-1,2-diyl and one or more H atoms may also be replaced by F with the proviso that R³ and R⁴ cannot both be hydrogen A⁷, A⁸, A⁹ and A¹⁰ are, independently of one another, identical or different and are each 1,4-phenylene, cyclohexane-1,4-diyl, unsubstituted or monosubstituted by F, cyclohex-1-ene-1,4-diyl, cyclohex-2-ene-1,4-diyl, 1-alkyl-1-sila-cyclohexane-1,4-diyl, bicyclo[2.2.2]octane-1,4-diyl, naphthalene-2,6-diyl, M⁷, M⁸, M⁹ and M¹⁰ are, independently of one another, identical or different and are each a single bond, —OC(=O)—, —(O=)C—O—, —OCH₂—, —CH₂—, —CH₂CH₂—, —CH₂CH₂——CH₂CH₂— or —C≡C— a, b, c and d are each zero or 1 with the proviso that 1≦{a+b+c+d}≦3 and the understanding that Mˣ is a single bond when the corresponding index is zero, (IIe) R³(—A⁷—M⁷)ₐ(—A⁸—M⁸)ᵦ—A⁶—(M⁹—A⁹)ᵧ—(M¹⁰—A¹⁰)ᵨ—R⁴ where A⁶ is

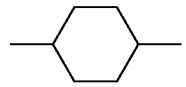

R³ and R⁴ are, independently of one another, identical or different and are each hydrogen, alkyl or alkyloxy having 2–12 carbon atoms, where one or two —CH₂— groups may be replaced by —CH=CH—, —OC(=O)—, —(O=)C—O—, —Si(CH₃)₂— or cyclopropane-1,2-diyl and one or more H atoms may also be replaced by F with the proviso that R³ and R⁴ cannot both be hydrogen A⁷, A⁸, A⁹ and A¹⁰ are, independently of one another, identical or different and are each cyclohexane-1,4-diyl, unsubstituted or monosubstituted by F, cyclohex-1-ene-1,4-diyl, cyclohex-2-ene-1,4-diyl, (M⁷, M⁸, M⁹ and M¹⁰ are, independently of one another, identical or different and are each a single bond, —OC(=O)—, —(O=)C—O—, —OCH₂—, —CH₂—O—, —CH₂CH₂—, —CH₂CH₂—CH₂CH₂— or —C≡C— a, b, c and d are each zero or 1 with the proviso that 1≦{a+b+c+d}≦3 and the understanding that Mˣ is a single bond when the corresponding index is zero, (IIf) R³(—A⁷—M⁷)ₐ(—A⁸—M⁸)ᵦ—A⁶—(M⁹—A⁹)ᵧ—(M¹⁰—A¹⁰)ᵨ—R⁴ where A⁶ is

R³ and R⁴ are, independently of one another, identical or different and are each hydrogen, alkyl or alkyloxy having 2–12 carbon atoms, where one or two —CH₂— groups may be replaced by —CH=CH—, —OC(=O)—, —(O=)C—O—, —Si(CH₃)2— or cyclopropane-1,2-diyl and one or more H atoms may also be replaced by F with the proviso that R³ and R⁴ cannot both be hydrogen A⁷, A⁸, A⁹ and A¹⁰ are, independently of one another, identical or different and are each 1,4-phenylene, cyclohexane-1,4-diyl, unsubstituted or monosubstituted by F, cyclohex-1-ene-1,4-diyl, cyclohex-2ene-1,4-diyl, bicyclo[2.2.2]octane-1,4-diyl M⁷, M⁸, M⁹ and M¹⁰ are, independently of one another, identical or different and are each a single bond, —OC(=O)—, —(O=)C—O—, —OCH₂—, —CH₂—O—, —CH₂CH₂—, —CH₂CH₂—CH₂CH₂— or —C≡C— a, b, c and d are each zero or 1 with the proviso that 1≦{a+b+c+d}≦3 and the understanding that Mˣ is a single bond when the corresponding index is zero, (IIg) R³(—A⁷—M⁷)ₐ(—A⁸—M⁸)ᵦ—A⁶—(M⁹—A⁹)ᵧ—(M¹⁰—A¹⁰)ᵨ—R⁴ where A⁶ is

R³ and R⁴ are, independently of one another, identical or different and are each hydrogen, alkyl or alkyloxy having 2–12 carbon atoms, where one or two —CH₂— groups may be replaced by —CH=CH—, —OC(=O)—, —(O=)C—O—, —Si(CH₃)₂— or cyclopropane-1,2-diyl and one or more H atoms may also be replaced by F with the proviso that R³ and R⁴ cannot both be hydrogen A⁷, A⁸, A⁹ and A¹⁰ are, independently of one another, identical or different and are each cyclohexane-1,4-diyl, unsubstituted or monosubstituted by F, cyclohex-1-ene-1,4-diyl, cyclohex-2-ene-1,4-diyl, M⁷, M⁸, M⁹ and M¹⁰ are, independently of one another, identical or different and are each a single bond, —OC(=O)—, —(O=)C—O—, —OCH₂—, —CH₂—O—, —CH₂CH₂—, —CH₂CH₂—CH₂CH₂— or a, b, c and d are each zero or 1 with the proviso that 1≦{a+b+c+d}≦3 and the understanding that Mˣ is a single bond when the corresponding index is zero, (IIh) R³(—A⁷—M⁷)ₐ(—A⁸—M⁸)ᵦ—A⁶—(M⁹—A⁹)ᵧ—(M¹⁰—A¹⁰)ᵨ—R⁴ where $A^6$ is

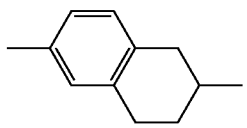

$R^3$ and $R^4$ are, independently of one another, identical or different and are each hydrogen, alkyl or alkyloxy having 2–12 carbon atoms, where one or two —$CH_2$— groups may be replaced by —CH=CH—, —OC(=O)—, —(O=)C—O—, —Si($CH_3$)$_2$— or cyclopropane-1,2-diyl and one or more H atoms may also be replaced by F with the proviso that $R^3$ and $R^4$ cannot both be hydrogen $A^7$, $A^8$, $A^9$ and $A^{10}$ are, independently of one another, identical or different and are each cyclohexane-1,4-diyl, unsubstituted or monosubstituted by F, cyclohex-1-ene-1,4-diyl, cyclohex-2-ene-1,4-diyl, $M^7$, $M^8$, $M^9$ and $M^{10}$ are, independently of one another, identical or different and are each a single bond, —OC(=O)—, —(O=)C—O—, —$OCH_2$—, —$CH_2$—O—, —$CH_2CH_2$—, —$CH_2CH_2CH_2CH_2$— or —C≡C— a, b, c and d are each zero or 1 with the proviso that $1 \leq \{a+b+c+d\} \leq 3$ and the understanding that $M^x$ is a single bond when the corresponding index is zero, (III) $R^5(-A^{11}-M^{11})_a(-A^{12}-M^{12})_b-A^{13}$ where $A^{13}$ is

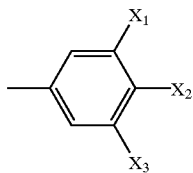

and $X^1$, $X^2$ and $X^3$ are, independently of one another, identical or different and are each H, Cl, F, $OCF_2H$ or $CF_3$ with the proviso that at least one of $X^1$, $X^2$ and $X^3$ is not H, $R^5$ is hydrogen, alkyl or alkyloxy having 2–12 carbon atoms, where one or two —$CH_2$— groups may be replaced by —CH=CH—, —OC(=O)—, —(O=)C—O—, —Si($CH_3$)$_2$— or cyclopropane-1,2-diyl and one or more H atoms may also be replaced by F $A^{11}$ and $A^{12}$ are, independently of one another, identical or different and are each 1,4-phenylene, cyclohexane-1,4-diyl, cyclohex-1-ene-1,4-diyl, cyclohex-2-ene-1,4-diyl, 1-alkyl-1-sila-cyclohexane-1,4-diyl, bicyclo[2.2.2]octane-1,4-diyl, indane-2,6-diyl, naphthalene-2,6-diyl, $M^{11}$ and $M^{12}$ are, independently of one another, identical or different and are each a single bond, —OC(=O)—, —(O=)C—O—, —$OCH_2$—, —$CH_2$—O—, —$CH_2CH_2$—, —$CH_2CH_2CH_2CH_2$— or —C≡C— a and b are each zero or 1 with the proviso that $1 \leq \{a+b\} \leq 2$ and the understanding that $M^x$ is a single bond when the corresponding index is zero, (IV) $R^6(-A^{14}-M^{14})_a(-A^{15}-M^{15})_b-(M^{16}-A^{16})_c-(M^{17}-A^{17})_d-M^{18}-R^7$ where $R^6$ is hydrogen, alkyl or alkyloxy having 2–12 carbon atoms, where one or two —$CH_2$— groups may be replaced by —CH=CH—, —OC(=O)—, —(O=)C—O—, —Si($CH_3$)$_2$— or cyclopropane-1,2-diyl and one or more H atoms may also be replaced by F $R^7$ is a moiety having at least one asymmetric carbon atom which is either part of an alkyl group having 3 to 16 carbon atoms, where one to four —$CH_2$— groups may also be replaced by —O—, —OC(=O)— or —(O=)C—O— and one of the substituents of the asymmetric carbon atom must be —$CH_3$, —$CF_3$, —$OCH_3$, —$CH_3$, Cl or F, or part of a 3- to 7-membered carbocycle, where one or two nonadjacent —$CH_2$— groups may also be replaced by —O— or one —$CH_2$— group may be replaced by —OC(=O)— or —(O=)C—O—, $A^{14}$, $A^{15}$, $A^{16}$ and $A^{17}$ are, independently of one another, identical or different and are each 1,4-phenylene, unsubstituted, monosubstituted or disubstituted by F or Cl, 1,3-phenylene, unsubstituted, monosubstituted or disubstituted by F or Cl, cyclohexane-1,4-diyl, unsubstituted or monosubstituted by F or CN, cyclohex-1-ene-1,4-diyl, 1-fluorocyclohex-1-ene-1,4-diyl, cyclohex-2-ene-1,4-diyl, 2-oxocyclohexane-1,4-diyl, 2-cyclohexen-1-one-3,6-diyl, 1-alkyl-1-sila-cyclohexane-1,4-diyl, bicyclo[2.2.2]octane-1,4-diyl, spiro[4.5]decane-2,8-diyl, spiro[5.5]undecane-3,9-diyl, indane-2,6-diyl, naphthalene-2,6-diyl, unsubstituted, monosubstituted or disubstituted by F or CN, pyrimidine-2,5-diyl, pyridine-2,5-diyl, pyrazine-2,5-diyl, pyridazine-3,6-diyl, quinoline-2,6-diyl, quinoline-3,7-diyl, isoquinoline-3,7-diyl, quinazoline-2,6-diyl, quinoxaline-2,6-diyl, 1,3-dioxane-2,5-diyl, thiophene-2,4-diyl, thiophene-2,5-diyl, 1,3-thiazole-2,4-diyl, 1,3-thiazole-2,5-diyl, benz-thiazole-2,6-diyl, 1,3,4-thiadiazole-2,5-diyl, piperidine-1,4-diyl or piperazine-1,4-diyl, $M^{14}$, $M^{15}$, $M^{16}$ and $M^{17}$ are, independently of one another, identical or different and are each a single bond, —OC(=O)—, —(O=)C—, —$OCH_2$—, —$CH_2$—O—, $CH_2CH_2$—, —$CH_2CH_2$—$CH_2CH_2$— or $M^{18}$ is a single bond, if the moiety having the asymmetric carbon atom is part of an alkyl chain, and a single bond, —$OCH_2$—, —$CH_2$—O—, —OC(=O)— or C(O=)O—, if the asymmetric carbon atom is part of the carbocycle defined under $R^7$ a, b, c and d are each zero or 1 with the proviso that $1 \leq \{a+b+c+d\} \leq 3$ and the understanding that $M^x$ is a single bond when the corresponding index is zero.

2. An active matrix display as claimed in claim 1 wherein R1 and $R^2$ are each straight-chain alkyl or alkoxy having 2 to 12 carbon atoms.

3. An active matrix display as claimed in claim 1 wherein the mixture comprises at least one compound in which, in $R^1$ and $R_2$, one nonterminal —$CH_2$— group is replaced by —OC(=O)—.

4. An active matrix display as claimed in claim 1 wherein in at least one compound of the formulae (I) or (II), in $R^1$ and/or $R^2$, at least one or more —$CH_2$— groups, but not the —$CH_2$— group adjacent to the nucleus, is replaced by —$CF_2$—.

5. An active matrix display as claimed in claim 1 wherein the mixture comprises at least 1 compound of the formula (IV) in which the asymmetric carbon atom is located in a fluoroalkyl, (trifluoromethyl)alkyl, methylalkyl or oxirane group.

6. An active matrix display as claimed in claim 1 wherein the achiral base mixture additionally comprises at least one compound having a phenylpyrimidine, fluorophenylpyrimidine, difluorophenylpyrimidine, phenylpyridine, fluorophenylpyridine, difluorophenylpyridine, benzthiazole-2,6-diyl or thiophene-2,5-diyl group.

7. An active matrix display as claimed in claim 1 wherein the length of the chiral nematic or cholesteric pitch in the liquid-crystal layer is more than 50 μm in a temperature range of at least 2° C. above the smectic phase transition.

8. A process for producing an active matrix display as claimed in claim 1 which comprises introducing the liquid-crystal layer into the space between a rubbed upper substrate plate and a rubbed lower substrate plate of the active matrix display, the rubbing directions on the upper substrate plate and the lower substrate plate being essentially parallel, and cooling the liquid-crystal phase from the isotropic phase, a direct electric voltage being applied to the display at least during the N*→smC* or N*→smA*→smC* phase transition.

9. An active matrix display which can be produced by the process as claimed in claim 8.

* * * * *